UNITED STATES PATENT OFFICE.

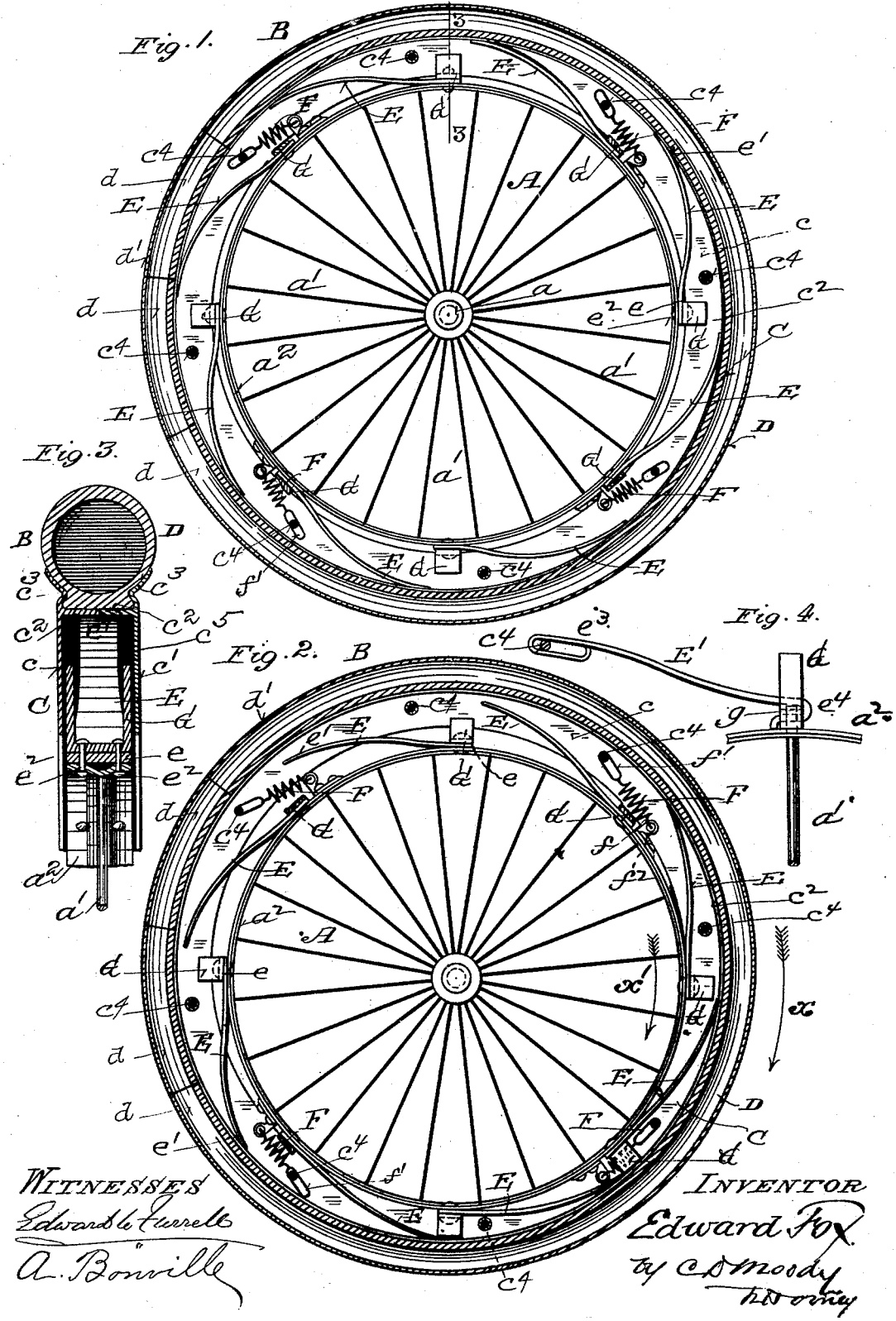

EDWARD FOX, OF ST. LOUIS, MISSOURI, ASSIGNOR OF TWO-THIRDS TO JOHN HARRIS AND JUSTIN J. McCARTHY, OF SAME PLACE.

WHEEL.

SPECIFICATION forming part of Letters Patent No. 519,790, dated May 15, 1894.

Application filed November 24, 1893. Serial No. 491,915. (No model.)

*To all whom it may concern:*

Be it known that I, EDWARD FOX, of St. Louis, Missouri, have made a new and useful Improvement in Wheels, of which the following is a full, clear, and exact description.

The improvement is adapted to vehicles of various descriptions, and especially to a bicycle wheel. It consists mainly in constructing the wheels with an inner central part and an outer annular part, the inner part being that portion of the wheel to which the power is applied, and being held elastically within the outer part, and so connected therewith that, when driven, it assumes an eccentric position in the outer part, bearing elastically in a downward and forward direction upon the outer part, and at the same time drawing the outer part around with it, and in such movement itself being, by reason of the reactive action of the elastic connections with the outer part, assisted in its rotation, all substantially as is hereinafter set forth and claimed, aided by the annexed drawings, making part of this specification, in which—

Figure 1 is a sectional elevation constructed according to the principle of the improvement, the inner and the outer parts of the wheel being concentrically arranged as when the wheel is not being driven; Fig. 2 a similar view, the inner part of the wheel being arranged eccentrically with reference to the outer part substantially as when the wheel is being driven; Fig. 3 a cross section on the line 3—3 of Fig. 1; and Fig. 4 a detail, being an elevation from the point of view of Figs. 1 and 2, and showing a modified form of one of the springs for supporting the inner part of the wheel.

The same letters of reference denote the same parts.

A represents the central portion of the wheel, consisting substantially of a hub $a$, spokes $a'$, and tire or rim $a^2$. The part A in itself is of ordinary construction. It may, for instance, be any ordinary wheel; it may be a bicycle or other cycle wheel, or a carriage wheel, and it may be constructed with its spokes in tension or in compression, and it may have any preferred diameter, so long as it is adapted to be united with and to operate the outer part of the wheel in accordance with the principle of the improvement.

B represents the outer part of the wheel. It has a rim C, and it may have a tire D. This outer part B may also be varied in its construction so long as it can coact with the inner part A of the wheel according to the principle of the improvement. In the present instance it has a tire, and the tire is of the pneumatic type. Its rim, C, is hollow to contain more or less of the elements employed in elastically connecting the inner and outer parts of the wheel, and when a tire, D, is used the rim C is suitably constructed to hold the tire. In the present instance the tire C is composed of the side plates $c$, $c'$, having respectively the inwardly-turned flanges $c^2$, $c^2$, and also the extensions $c^3$, $c^3$, and united by means of the cross bolts or other cross fastenings, $c^4$, substantially as shown.

E E E represent springs for sustaining the inner part A in the outer part B of the wheel. The preferred form and arrangement of said springs are shown, the springs being extended strips of elastic metal such as steel, and secured at one end $e$ to the inner part A, and the outer end $e'$ being adapted to bear against some part of the outer part B of the wheel, and all so that when the inner part A is free it shall assume a central position with the outer part B, but when driven shall shift into a position more or less eccentric with reference to the outer part B. In the present instance the springs E are riveted to the rim $a^2$ by means of the rivets $e^2$ and from their point of connection with the rim $a^2$ the springs extend substantially tangentially to the rim $a^2$. The springs E may also serve to connect the parts A and B so that the inner part A when rotated can draw the outer part B around with it. I prefer however to employ for this purpose means distinct from the springs E. The preferred means are the connections F F. These last named parts are preferably in the form of extensible springs at one end, $f$, fastened to the part A and at the outer end $f'$ fastened to the part B. As illustrated the end $f$ is jointed to the ear $f^2$ that in turn is fastened to the rim $a^2$, and the end $f'$ is in the form of a loop, and it is connected with the part B by passing the loop around the bolt $c^4$. By this means not only is an elastic tie provided but also one that enables the part A to be shifted in its position with reference to the part B. Means are also employed for keeping the parts A and B in the same plane vertically and for this purpose I prefer to use the clips G which are U-shaped in cross section and are fastened to the part A and preferably by means of the rivets $e^2$, and which project into the space $c^5$ within the tire C and thereby act as a guide in the movement of the part A with reference to the part B.

The operation of the improved wheel is as follows: When at rest the parts assume the position indicated substantially in Fig. 1: but when a load comes upon the inner part A that part is shifted with relation to the part B, and when the wheel is being driven, say in the direction indicated by the arrow $x$ Fig. 2, the part A is shifted more or less forward as well as downward in the part B, and into the position substantially indicated in Fig. 2: in this position the springs E that are at the lower forward portion of the wheel are pressed against the part B, and the remaining springs E, are more or less withdrawn from their respective points of bearing upon the part B: at the same time the part A is more or less turned around with relation to the part B and the ties F are exerting a drawing action upon the part B saving at the lower backward portion of the wheel: the result of this is the easier rotation of the wheel; for those of the springs E which are at the lower rear portion of the wheel are reacting to influence the rotation of the inner part A in the direction indicated by the arrow $x'$; this influence is exerted with every vibration of the part A as it moves eccentrically in the part B, and the movement may be likened to the action of the lower part of limbs of a horse as it gallops over the ground.

In Fig. 4 a spring $E'$ having a different form of connection with the parts A and B is shown; the outer end of the spring is adapted not only to bear upon such outer part but also, by being looped substantially as shown at $e^3$, to connect with some part, such as the cross bolt $c^4$, and thereby enabled to rotate the part A as well as to bear elastically thereupon: and at its inner end the spring is hooked at $e^4$ to enable it to engage with any coacting part such as the bar $g$ of the guide G, substantially as shown. The tire D may be in the form of sections $d$ which, when worn, upon the outer face $d'$ may be reversed to bring the opposite side into use.

I claim—

The combination of the inner part A and outer part B having the hollow rim, the springs E, the ties F, and the guides G, substantially as described.

Witness my hand this 20th day of November, 1893.

EDWARD FOX.

Witnesses:
C. D. MOODY,
JOHN HARRIS.